United States Patent
Imai et al.

(10) Patent No.: US 7,028,151 B2
(45) Date of Patent: Apr. 11, 2006

(54) INFORMATION PROCESSING DEVICE EQUIPPED WITH IMPROVED ADDRESS QUEUE REGISTER FILES FOR CACHE MISS

(75) Inventors: Satoshi Imai, Kawasaki (JP); Fumihiko Hayakawa, Kawasaki (JP); Atsuhiro Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 10/643,223

(22) Filed: Aug. 19, 2003

(65) Prior Publication Data

US 2004/0039877 A1   Feb. 26, 2004

(30) Foreign Application Priority Data

Aug. 21, 2002 (JP) .............................. 2002-239991

(51) Int. Cl.
*G06F 12/00* (2006.01)
(52) U.S. Cl. .................. 711/156; 711/113; 711/118; 711/144
(58) Field of Classification Search ................ 711/156, 711/113, 118, 144
See application file for complete search history.

(56) References Cited

U.S. PATENT DOCUMENTS 5,813,045 A * 9/1998 Mahalingaiah et al. ..... 711/204
6,321,301 B1 * 11/2001 Lin et al. .................... 711/137

* cited by examiner

*Primary Examiner*—Matthew Kim
*Assistant Examiner*—Hetul Patel
(74) *Attorney, Agent, or Firm*—Staas & Halsey LLP

(57) ABSTRACT

When an input address AD is previously stored in a register 211, if a matching signal EQ1 is active, then an address queue control circuit 19A latches an offset of the input address AD into a register 241, or else, latches the input address AD into a register 212 through a selector 262. When the input address AD is previously stored in the register 241, the address queue control circuit 19A latches the input address AD into the register 212 through the selector 262. After reading the contents of the register 211, the address queue control circuit 19A shifts the offset OFS of the register 241 to the offset field of the register 211 through a selector 261, and resets a valid flag EF of the register 241.

12 Claims, 12 Drawing Sheets

FIG.3

|   |   | 21A | | 24 | |
|---|---|-----|---|----|---|
|   |   | EF | WS | | EF |

(A) T0

| 0 |  | 0 | 0 |  | 0 |
| 1 |  | 0 | 0 |  | 0 |
| 2 |  | 0 | 0 |  | 0 |
| 3 |  | 0 | 0 |  | 0 |

EQ0 = '0'

| 0 | WP |
| 0 | RP |

← AD0

(B) T1

| 0 | AD0 | 1 | 1 |  | 0 |
| 1 |  | 0 | 0 |  | 0 |
| 2 |  | 0 | 0 |  | 0 |
| 3 |  | 0 | 0 |  | 0 |

EQ0 = '1'

| 0 | WP |
| 0 | RP |

← AD1

(C) T2

| 0 | AD0 | 1 | 1 | AD1 | 1 |
| 1 |  | 0 | 0 |  | 0 |
| 2 |  | 0 | 0 |  | 0 |
| 3 |  | 0 | 0 |  | 0 |

EQ1 = '0'

| 1 | WP |
| 0 | RP |

← AD2

(D) T3

| 0 | AD0 | 1 | 1 | AD1 | 1 |
| 1 | AD2 | 1 | 1 |  | 0 |
| 2 |  | 0 | 0 |  | 0 |
| 3 |  | 0 | 0 |  | 0 |

EQ1 = '0'

| 1 | WP |
| 0 | RP |

|   |   |   | 21A | | 24 | |   |
|---|---|---|---|---|---|---|---|
|   |   |   | | EF | WS | | EF |
| (A) | T4 | 0 | AD1 | 1 | 0 | AD1 | 0 |
|   |   | 1 | AD2 | 1 | 0 |   | 0 |
|   |   | 2 | AD3 | 1 | 1 |   | 0 |
|   |   | 3 |   | 0 | 0 |   | 0 |

EQ2 = '1'

| 2 | WP |
|---|---|
| 0 | RP |

←— AD4
—→ AD1

| (B) | T5 | 0 | AD1 | 0 | 0 | AD1 | 0 |
|---|---|---|---|---|---|---|---|
|   |   | 1 | AD2 | 1 | 0 |   | 0 |
|   |   | 2 | AD3 | 1 | 1 | AD4 | 1 |
|   |   | 3 |   | 0 | 0 |   | 0 |

EQ0 = '0'

| 3 | WP |
|---|---|
| 1 | RP |

←— AD5
—→ AD2

| (C) | T6 | 0 | AD1 | 0 | 0 | AD1 | 0 |
|---|---|---|---|---|---|---|---|
|   |   | 1 | AD2 | 0 | 0 |   | 0 |
|   |   | 2 | AD3 | 1 | 1 | AD4 | 1 |
|   |   | 3 | AD5 | 1 | 1 |   | 0 |

EQ3 = '0'

| 3 | WP |
|---|---|
| 2 | RP |

←— AD6

| (D) | T7 | 0 | AD6 | 1 | 1 | AD1 | 0 |
|---|---|---|---|---|---|---|---|
|   |   | 1 | AD2 | 0 | 0 |   | 0 |
|   |   | 2 | AD3 | 1 | 1 | AD4 | 1 |
|   |   | 3 | AD5 | 1 | 1 |   | 0 |

EQ0 = '0'

| 0 | WP |
|---|---|
| 2 | RP |

←— AD7

INFORMATION PROCESSING DEVICE EQUIPPED WITH IMPROVED ADDRESS QUEUE REGISTER FILES FOR CACHE MISS

CROSS-REFERENCE TO RELATED APPLICATIONS

This application is based upon and claims the benefit of priority from the prior Japanese Patent Application No. 2002-239991, filed on Aug. 21, 2002, the entire contents of which are incorporated herein by reference.

BACKGROUND OF THE INVENTION

1. Field of the Invention

The present invention relates to an information processing device provided in a processor to store an address into address queue register files and read the address therefrom on a FIFO basis to provide it to a main memory control circuit when a cache miss has occurred.

2. Description of the Related Art

FIG. 10 is a schematic block diagram showing a processor of the prior art connected to a main memory.

In the processor 10, an instruction execution circuit 11 calculates an address of an operand included in an instruction, and, if the address is a logical address, further converts it to a corresponding physical address, and then provides it as an address AD to a data access circuit 12.

As shown in FIG. 11, in connection with a cache memory 17, the address AD is divided into fields of a tag TAG, an entry ENT, and an offset OFS in descending order, where the entry ENT is provided to an address input of a tag table 14. A hit/miss determination circuit 15 compares the value of the tag TAG of the input address AD with the value of a tag read from the tag table 14, and provides the compared result, as a cache hit/miss signal H/M, to a cache control circuit 16 of FIG. 10.

The instruction execution circuit 11 provides a request signal RQ to the cache control circuit 16, simultaneously with the provision of the input address AD. In response to the request signal RQ, the cache control circuit 16 provides an acknowledge signal ACK to the instruction execution circuit 11. When the cache hit/miss signal H/M is active, i.e., when a cache hit occurs, the cache control circuit 16 provides the values of the entry ENT and the offset OFS of the input address AD, together with the request signal, to the cache memory 17.

In response to this, the cache memory 17 outputs a part of a long word addressed by the value of the entry ENT to a data output, in which the part of the long word is designated by the value of the offset OFS, and also provides a ready signal to the cache control circuit 16. In response to this, the cache control circuit 16 allows a selector 18 to switch to the output of the cache memory 17, and provide this output, as a read data RD, to the instruction execution circuit 11. At the same time, the cache control circuit 16 provides the ready signal RDY and the input address AD corresponding to the read data RD to the instruction execution circuit 11. In response to this, the instruction execution circuit 11 receives the read data RD as the content of the input address AD.

When the cache hit/miss signal H/M is inactive, i.e., when a cache miss occurs, an address queue control circuit 19 stores the input address AD in a register file 21 of an address queue storing & selecting circuit 20 on a FIFO basis. The address queue control circuit 19 writes a wait state WS, in correspondence with the input address AD, to the register file 21 on a FIFO basis. The wait state WS represents a main memory request wait or the completion of writing a read data from the main memory to the cache memory 17. While providing a main memory read request signal MRQ to the main memory control circuit 23, the address queue control circuit 19 provides a selection control signal to the selector 22 so that the wait state WS and the input address AD stored in the resister file 21 on a FIFO basis (referred to as a "stored input address AD") are provided to the main memory control circuit 23.

In response to the main memory read request signal MRQ, the main memory control circuit 23 performs the following processes if the wait state WS represents the memory request wait. Namely, the control circuit 23 reads from the main memory 30 a series of data represented by a tag TAG and an entry ENT of a main memory read address MRA corresponding to the stored input address AD read from the register file 21. The control circuit 23 provides the series of data, as a cache write data CD, to the cache memory 17, while providing the main memory read address MRA to the cache control circuit 16. When an address of the cache write data CD currently being output is coincident with the main memory read request signal MRQ, the control circuit 23 provides a ready signal RDY to the cache control circuit 16.

The cache control circuit 16 addresses the cache memory 17 by the tag TAG and the entry ENT of the main memory read address MRA so as to write the cache write data CD to the cache memory 17. In response to the ready signal RDY, the cache control circuit 16 allows the selector 18 to switch to the data CD and provide the corresponding data, as a read data RD, to the instruction execution circuit 11, while providing the read address RA (=MRQ) and the ready signal RDY to the instruction execution circuit 11. When the writing of the data CD to the cache memory 17 is completed, the cache control circuit 16 addresses the tag table 14 by the entry ENT of the main memory read address MRA corresponding to the data CD, so as to write the tag TAG of the address MRA to the tag table 14.

In the case where a plurality of addresses, whose tag TAG and entry ENT are identical to each other, are included in addresses stored in the register file 21, if one of the plurality of addresses is provided to the main memory control circuit 23 to access the main memory 30, it is not necessary to access the main memory 30 for the remaining addresses of the plurality of addresses, and thus the address queue control circuit 19 replaces the current value of the wait state WS in the register file 21 with a value representing the completion of writing to the cache memory 17.

In the case where the wait sate WS represents the writing completion, in response to the main memory read request signal MRQ from the address queue control circuit 19, the main memory control circuit 23 provides the main memory read address MRA and a signal representing the wait state WS to the cache control circuit 16. In response to this, the cache control circuit 16 performs the same process as in the case where the cache hit/miss signal H/M is active.

For the sake of simplification, FIG. 10 omits the illustration of elements in the data access circuit 12 for writing data to the address AD.

Now, a description will be given of the operation of the register file 21, referring to FIG. 12.

For the sake of a simpler explanation, it is assumed that the register file 21 can store up to 3 of the number of the input addresses AD. It is also assumed that any of addresses AD1 to AD4 is an input address of the same tag and entry which causes a cache miss, whereas an address AD5 is an input address which causes a cache hit.

At time T1, the input address AD1 is stored in the register file 21, and it is selected by the selector 22 to be provided to the main memory control circuit 23. A symbol τ is defined to represent the time required for the main memory control circuit 23 to read a series of data from the main memory 30 and store it in the cache memory 17 after gaining read access to the main memory 30.

At times T2 and T3, the input addresses AD2 and AD3 are stored in the register file 21, respectively. The address queue control circuit 19 provides a signal representing a full state of the register file 21 to the cache control circuit 16. In response to this, the cache control circuit 16 causes a busy signal BSY, which is to be provided to the instruction execution circuit 11, to be active. The instruction execution circuit 11 stops the operation until the busy signal BSY is inactive.

For this reason, despite the existence of data of the input address AD5 in the cache memory 17, it is impossible to perform the reading of this data.

At time T1+τ, the stored input address AD1 becomes invalid, and the input address AD4 is stored at the location where the input address AD1 has been stored.

In general, the possibility of using data of addresses in proximity to each other is relatively high, so if an input address AD causes a cache miss, subsequent input addresses having the same tag and entry as the input address AD continuously cause a cache miss. Thereby, the register file 21 becomes full, stopping the operation of the instruction execution circuit 11. This makes it difficult to achieve a higher operating speed.

This problem can be overcome by increasing the storage capacity of the register file 21.

However, this increase the circuit size of the address queue storing & selecting circuit 20, since the input address AD is relatively long, for example, 32 bits.

SUMMARY OF THE INVENTION

Accordingly, it is an object of the present invention to provide an information processing device, whereby the number of storable addresses is increased by suppressing the increase of the storage capacity.

In one aspect of the present invention, there is provided an information processing device for, when an input address causes a cache miss, storing and reading the input address including first and second fields on a FIFO basis to provide the input address to a main memory control circuit, the device comprising:

a first register file including a plurality of first registers for storing, in each first register, a first address consisting of the first and second fields, a valid flag indicating whether the first address is valid or invalid, and wait state information;

a second register file including a plurality of second registers, corresponding to the respective plurality of first registers, for storing, in each second register, a second address consisting of the second field, and a valid flag indicating whether the second address is valid or invalid;

a comparison circuit for comparing a value of the first field of the input address and a value of the first field of each of the plurality of first registers; and a control circuit for:

allowing the input address to be stored in one of the first registers whose valid flag indicates an invalid state, and changing this valid flag to indicate a valid state, or, if a comparison result by the comparison circuit between one of the first registers whose valid flag indicates a valid state and the input address indicates a matching, then allowing the second field of the input address to be stored in corresponding one of the second registers whose valid flag indicates an invalid state, and changing this valid flag to indicate a valid state; and selectively allowing contents of one of the first registers whose valid flag indicates a valid state to be read; if the valid flag of corresponding one of the second registers indicates an invalid state, then changing this valid flag to indicate an invalid state, or else, allowing a value of the second field of this one of the second registers to be shifted to the second field of the corresponding one of the first registers, and changing the valid flag of this one of the second registers to indicate an invalid state.

According to the above aspect of the present invention, it is not necessary for the second register to have the first field and the wait state information, so the increase of the storage capacity of the information processing device is suppressed. This makes it possible to increase the number of storable input addresses, thereby reducing the circuit size of the information processing device.

Other aspects, objects, and the advantages of the present invention will become apparent from the following detailed description taken in connection with the accompanying drawings.

BRIEF DESCRIPTION OF THE DRAWINGS

FIG. 3 is an operation sequence view illustrating the sequence of write and read operations for the register files;

FIG. 4 is an operation sequence view continued from the FIG. 3;

DESCRIPTION OF THE PREFERRED EMBODIMENTS

Figure 1:
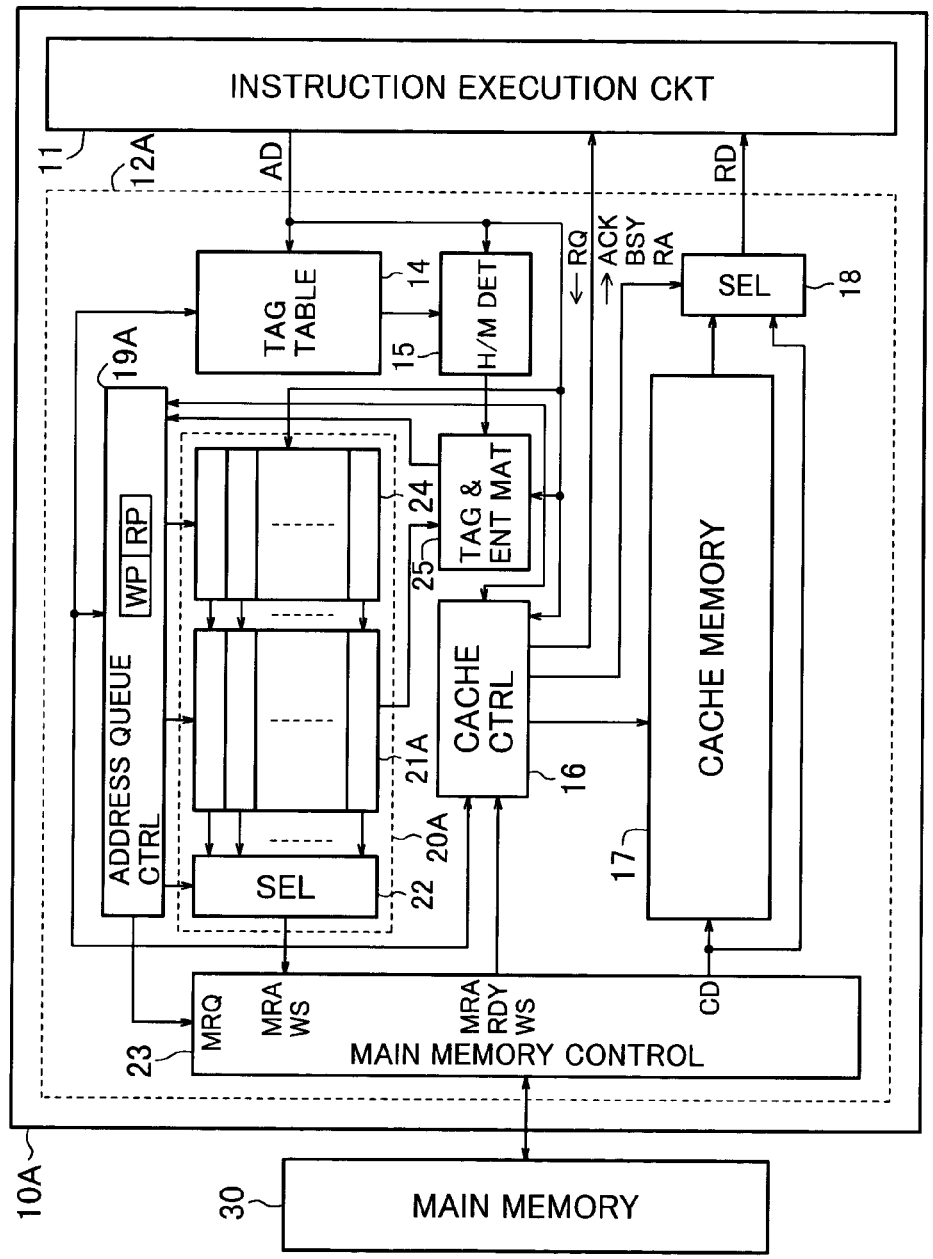
FIG. 1 is a schematic block diagram showing a processor connected to a main memory, according to a first embodiment of the present invention.

Referring now to the drawings, wherein like reference characters designate like or corresponding parts throughout several views, preferred embodiments of the present invention will be described below.

First Embodiment

FIG. 1 is a schematic block diagram showing a processor 10A connected to a main memory 30, according to a first embodiment of the present invention. For the sake of simplification, FIG. 1 omits the illustration of elements in a data access circuit 12A for writing data to an address AD.

In the data access circuit 12A, an address queue storing & selecting circuit 20A includes a sub-register file 24 having registers corresponding to respective registers of a main register file 21A. In addition, a tag & entry matching judgment circuit 25 is provided in the data access circuit 12A in order to effectively store an input address AD in the register files 21A and 24.

The tag & entry matching judgment circuit 25 receives a valid flag EF, a tag TAG and an entry ENT of an address in each register of the main register file 21A, and the input address AD. Then, the tag & entry matching judgment circuit 25 judges whether there is a register which has a valid flag EF indicating a valid state and matches the values of the tag TAG and entry ENT of the input address AD, and provides the judgment result to the address queue control circuit 19A.

The address queue control circuit 19A selects a register of the main register file 21A or the sub-register file 24, based on the judgment result, and allows the selected register to store the input address AD entirely or partially. A write pointer WP and a read pointer RP are provided in the address queue control circuit 19A for FIFO processing of the register files 21A and 24.

Figure 2:
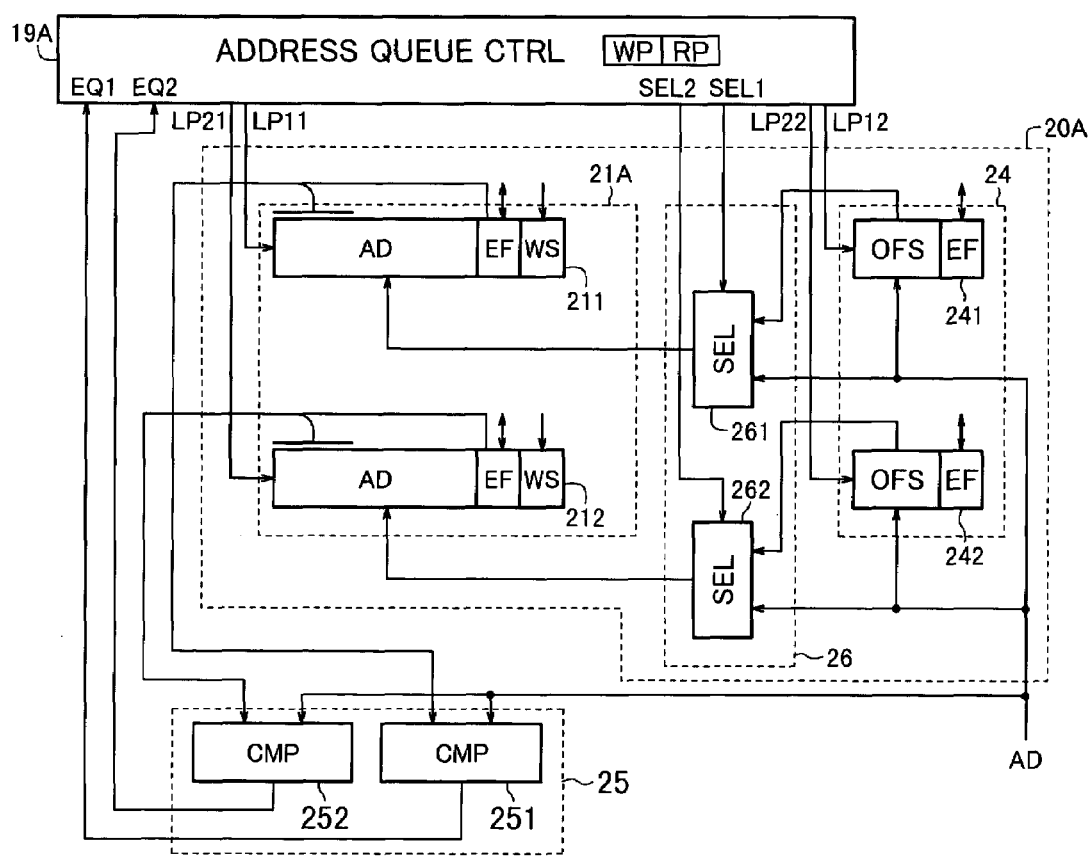
FIG. 2 is a schematic block diagram showing a detailed configuration of a cache miss address queue as a, characterizing part of the first embodiment of the present invention, in the case where the number of registers of a main register file is 2 for the sake of simplification.

FIG. 2 is a schematic block diagram showing a detailed configuration of a cache miss address queue as a characterizing part of the first embodiment of the present invention, in the case where the number of registers of the main register file 21A is 2 for the sake of simplification.

The main register file 21A includes registers 211 and 212 of the same configuration. The register 211 includes fields of a stored input address AD, a valid flag EF indicating whether the address AD is valid or invalid, and a wait state WS described above. Each of valid flags EF and wait states WS in the main register file 21A is connected to the address queue control circuit 19A.

The sub-register file 24 includes registers 241 and 242 corresponding to the registers 211 and 212, respectively. The registers 241 and 242 have the same configuration. The register 241 has fields of an offset OFS of the input address AD and a valid flag EF. Namely, the register 241 can be configured by omitting the tag and entry of the input address AD and the wait state WS from the register 211.

A selective transmission circuit 26 is connected between the sub-register file 24 and the main register file 21A. The selective transmission circuit 26 includes selectors 261 and 262 corresponding to the registers 241 and 242, respectively. The offset OFS of the register 241 is provided to one input of the selector 261, and the input address AD is provided to another input thereof. The output of the selector 261 is connected to the input address storing field of the register 211. A selection control signal SEL1 from the address queue control circuit 19A is provided to a control input of the selector 261. In the case where the offset OFS of the register 241 is selected by the selection control signal SEL1, the corresponding content is provided only to the OFS field of the AD field of the register 211, whereas in the case where the input address AD is selected, the corresponding content is provided to the AD field of the register 211. In each case, the corresponding content is latched into the register 211 at the timing of a latch pulse LP11 from the address queue control circuit 19A.

The selector 262 operates in the same manner as the selector 261.

The tag & entry matching judgment circuit 25 includes comparators 251 and 252 of the same configuration. The input address AD is provided to one input of each of the comparators 251 and 252, and the values of the tag TAG and entry ENT of the stored input address and the valid flag EF in each of the registers 211 and 212 are provided to another input of each of the comparators 251 and 252. If the values of the tag TAG and entry ENT of the input address AD match the values of the tag TAG and entry ENT of the stored input address of the register 211, respectively, and the valid flag EF of the register 211 indicates a valid state, the comparator 251 causes the output EQ1 to be active. This matching signal EQ1 is provided to the address queue control circuit 19A. The comparator 252 operates in the same manner as the comparator 251.

In the case where the input address AD is previously stored in the register 211, if the matching signal EQ1 is active, then the address queue control circuit 19A allows the offset OFS of the input address AD to be latched into the register 241 by a latch pulse LP12, or else, the circuit 19A allows the selector 262 to switch to the input address AD by a selection control signal SEL2 and also allows the input address AD to be latched into the register 212 by a latch pulse LP21.

In the case where the input address AD is previously stored in the register 241, the address queue control circuit 19A allows the selector 262 to switch to the input address AD by the selection control signal SEL2, and also allows the input address AD to be latched into the register 212 by the latch pulse LP21.

In the case where the input address AD is previously stored in the register 212, if the matching signal EQ2 is active, then the address queue control circuit 19A allows the offset OFS of the input address AD to be latched into the register 242 by a latch pulse LP22, or else, the circuit 19A allows the selector 261 to switch to the input address AD by the selection control signal SEL1, and also allows the input address AD to be latched into the register 211 by a latch pulse LP11.

In the case where the input address AD is previously stored in the register 242, the address queue control circuit 19A allows the selector 261 to switch to the input address AD by the selection control signal SEL1, and also allows the input address AD to be latched into the register 211 by the latch pulse LP11.

After allowing the content of the register 211 to be read out, the address queue control circuit 19A allows the offset OFS of the register 241 to be shifted to the offset field of the register 211 through the selector 261, and resets the valid flag EF and wait state WS of the register 241. Thereby, the tag and entry of the register 211 and the wait state WS can also be used as data for the offset OFS of the register 241.

FIGS. 3 and 4 are operation sequence views illustrating the sequence of write and read operations for the register files 21A and 24. FIGS. 3(A) to 3(D) and FIGS. 4(A) to 4(D) show the states of the registers at times T0 to T3 and at times T4 to T7, respectively.

The content i of the write pointer WP represents an address value of the register file 21A or 24 to be written next. The content j of the read pointer RP represents an address value of the main register file 21A to be read next.

If the tag TAG and entry ENT of the input address AD match the tag TAG and entry ENT, respectively, of a stored input address of an i-th register of the main register file 21A, EQi='1', and, if not, EQi='0'. In addition, if WS='1', it represents that a writing of one long word from the main memory 30 to the cache memory 17 is in a wait state, whereas if WS='0', it represents that the writing has been completed and a reading from the cache memory 17 is in a wait state. The valid flag EF and the wait state WS of an address i in the main register file 21A are denoted by EFmi and WSi, respectively, and the valid flag EF of the sub-register file 24 is denoted by EFsi.

The writing of the input address AD to the address queue storing & selecting circuit 20A is performed according to the following rules.

(1) When WP=i, EFmi='0', EQi='0', and the input address AD is ADi (AD=ADi), ADi is written to the address i of the main register file 21A, and EFmi and WSi are set.

(2) When WP=i, EFmi='1', EQi='1', and AD=ADi, ADi is written to the address i of the sub-register file 24, EFsi is set, and the write pointer WP is incremented by 1.

When the number of registers of the main register file 21A is n, the write pointer WP ranges from 0 to n−1. Thus, when the write pointer WP is n−1, the write pointer WP returns to 0 if it is incremented by 1. The same is true for the read pointer RP.

(3) When WP=i, EFmi='1', EQi='0', and AD=ADi, the write pointer WP is incremented by 1 to be i+1, ADi is written to the address i+1 of the sub-register file 24, and EFsi is set.

The reading of the stored input address AD from the address queue storing & selecting circuit 20A is performed according to the following rules.

(1) When RP=j, EFmj='1', AD=ADmj (a stored input address AD in an address j of the main register file 21A is ADmj), EFsj='1', and OFS=OFSsj (an offset OFS of a stored input address in an address j of the sub-register file 24 is OFSsj), ADj and WS are read from the address j of the main register file 21A, and the offset OFSsj is transferred to the address j of the main register file 21A to be written to the offset OFSsj of ADmi, and then EFsj is reset and WSj is reset.

(2) When RP=j, EFmj='1', AD=ADmj, and EFsj='0', ADmj and WSj are read from the address j of the main register file 21A, EFmj is reset, and the read pointer RP is incremented by 1.

Initially, the write pointer WP and the read pointer RP are cleared to zero, and all the valid flags EF and wait states WS of the main register file 21A are reset.

(T0) Since WP=0, EQ0='0', and EFm0='0', AD (=AD0) is written to the address 0 of the main register file 21A, and EFm0 and WS0 are set.

Since RP=0, AD0 is read from the address 0 of the main register file 21A, and provided to the main memory control circuit 23 of FIG. 1. Since WS0='1', the main memory control circuit 23 starts read access to the main memory 30 at a series of addresses matching the tag and entry of AD0.

(T1) Since WP=0, EQ0='1', and EFm0='1', the offset of AD (=AD1) is written to the address 0 of the sub-register file 24, EFs0 is set, and the write pointer WP is incremented to be 1.

(T2) Since WP=1, EQ0='0', and EFm1='0', AD (=AD2) is written to the address 1 of the main register file 21A, and EFm1 and WS1 are set.

(T3) Since WP=1, EQ1='0', and EFm1='1', the write pointer WP is incremented to be 2, AD (=AD3) is written to the address 2 of the main register file 21A, and EFm2 and WS2 are set.

The read access at time T1 is completed, so that read data of 1 long word is stored in the cache memory 17, and an update completion signal is provided from the cache control circuit 16 to the address queue control circuit 19A. Since EFs0='1', in response to this, the address queue control circuit 19A transfers and writes the offset of AD1 to the offset field in a register of the same address 0 in the main register file 21A, and then resets EFs0. In addition, all the wait states WS of registers having the same tag TAG and entry ENT as the tag and entry of AD1 and having a valid flag EF of '1', among the stored input addresses AD in the main register file 21A, is set to '0' (i.e., a cache memory access wait state) by the address queue control circuit 19A.

(T4) Since WP=2, EQ2='1', and EFm2='1', the offset OFS of AD (=AD4) is written to the address 2 of the sub-register file 24, EFs2 is set, and the write pointer WP is incremented to be 3.

AD1 and the wait state WS0 is read from the address 0 of the main register file 21A, and the valid flag EFm0 is reset. Since EFm0 =EFs0='0', the read pointer RP is incremented to be 1. Since WS0='0', the address queue control circuit 19A provides MRA (=AD1) and WS0 to the cache control circuit 16, and requests the cache control circuit 16 to read data of this address. Accordingly, the corresponding data is read from the cache memory 17.

(T5) Since WP=3, EQ3='0', and EFm3='0', AD (=AD5) is written to the address 3 of the main register file 21A, and EFm3 and WS3 are set.

AD2 and the wait state WS1 are read from the address 1 of the main register file 21A, and the valid flag EFm1 thereof is reset. Since EFm0=EFs0='0', the read pointer RP is incremented to be 2. Since WS1='0', the address queue control circuit 19A provides MRA (=AD2) and WS1 to the cache control circuit 16, and requests the cache control circuit 16 to read data of this address. Accordingly, the corresponding data is read from the cache memory 17.

(T6) Since WP=3, EQ3='0', and EFm3='1', the write pointer WP is incremented to return to 0, AD (=AD6) is written to the address 0 of the main register file 21A, and EFm0 and WS0 are set.

AD3 and WS2 are read from the address 2 of the main register file 21A, and provided to the main memory control circuit 23 of FIG. 1. Since WS2='1', the main memory control circuit 23 starts read access to the main memory 30 at a series of addresses matching the tag and entry of AD3.

(T7) Since WP=0, EQ0='0', and EFm0='1', the write pointer WP is incremented to be 1, AD (=AD7) is written to the address 1 of the main register file 21A, and EFm1 and WS1 are set.

In this manner, the address queue control circuit 19A performs a FIFO control for the address queue storing & selecting circuit 20A.

Figure 5:
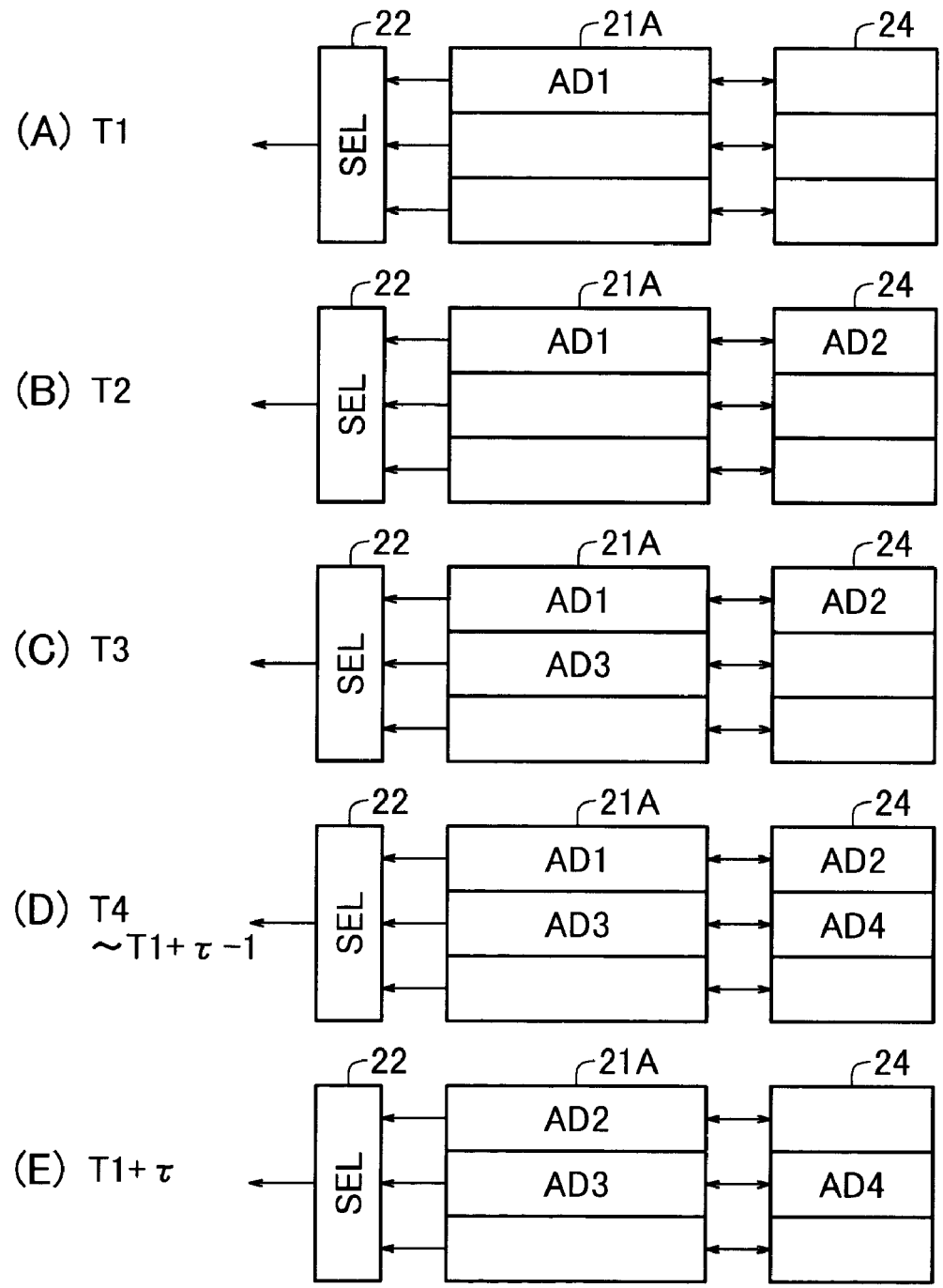
FIG. 5 is an operation sequence view illustrating the case where input addresses AD1 to AD4 are sequentially stored.
Figure 12:
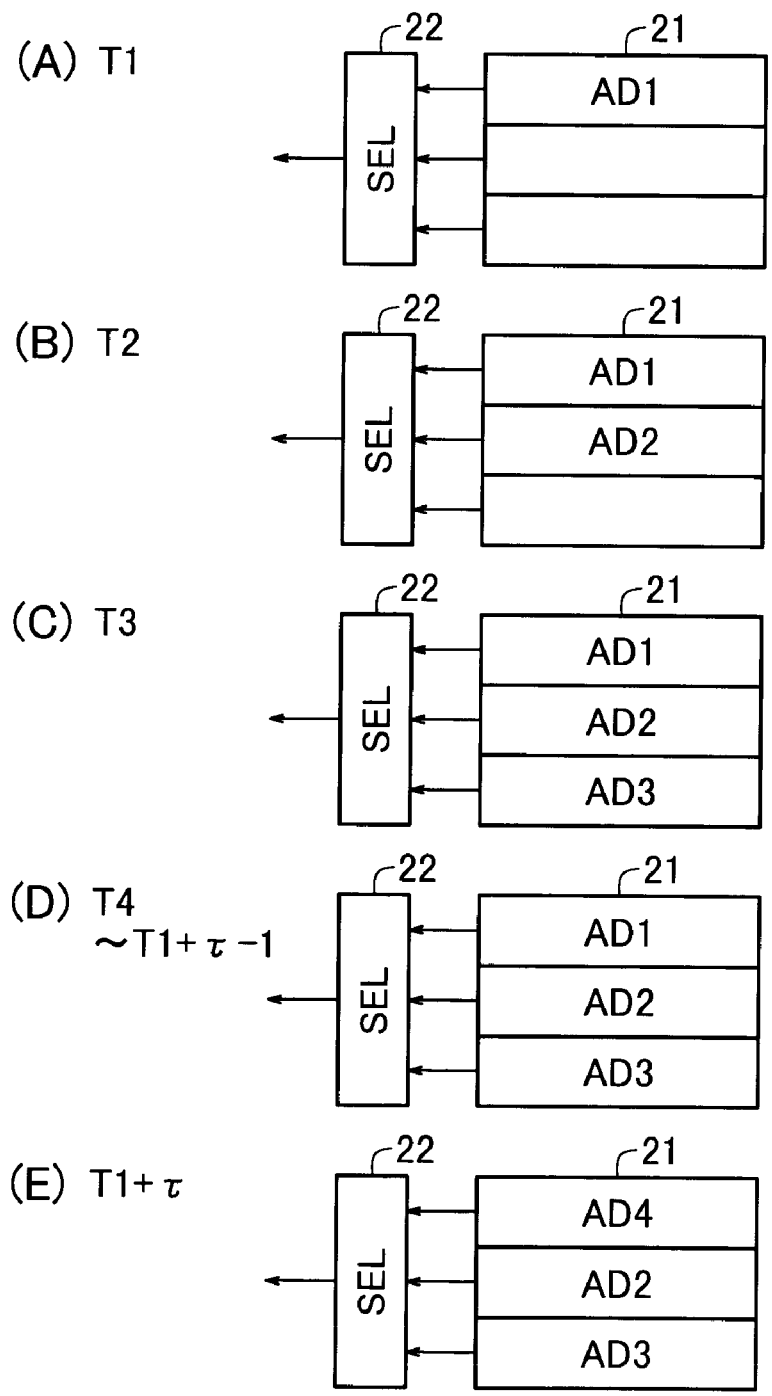
FIG. 12 is an operation sequence view of a cache miss address queue of FIG. 10.

FIG. 5 is an operation sequence view illustrating the sequence of read and write operations for the register files 21A and 24, when AD1 to AD4 are sequentially stored in the same condition as that of FIG. 12.

According to the first embodiment, it is not necessary for registers of the sub-register file 24 to have fields of the wait state, and the tag and entry of the input address to be stored. Thus, the increase of the address queue storage capacity is suppressed, making it possible to increase the number of storable input addresses. This allows a reduction in the circuit size of the cache miss address queue.

Second Embodiment

Figure 6:
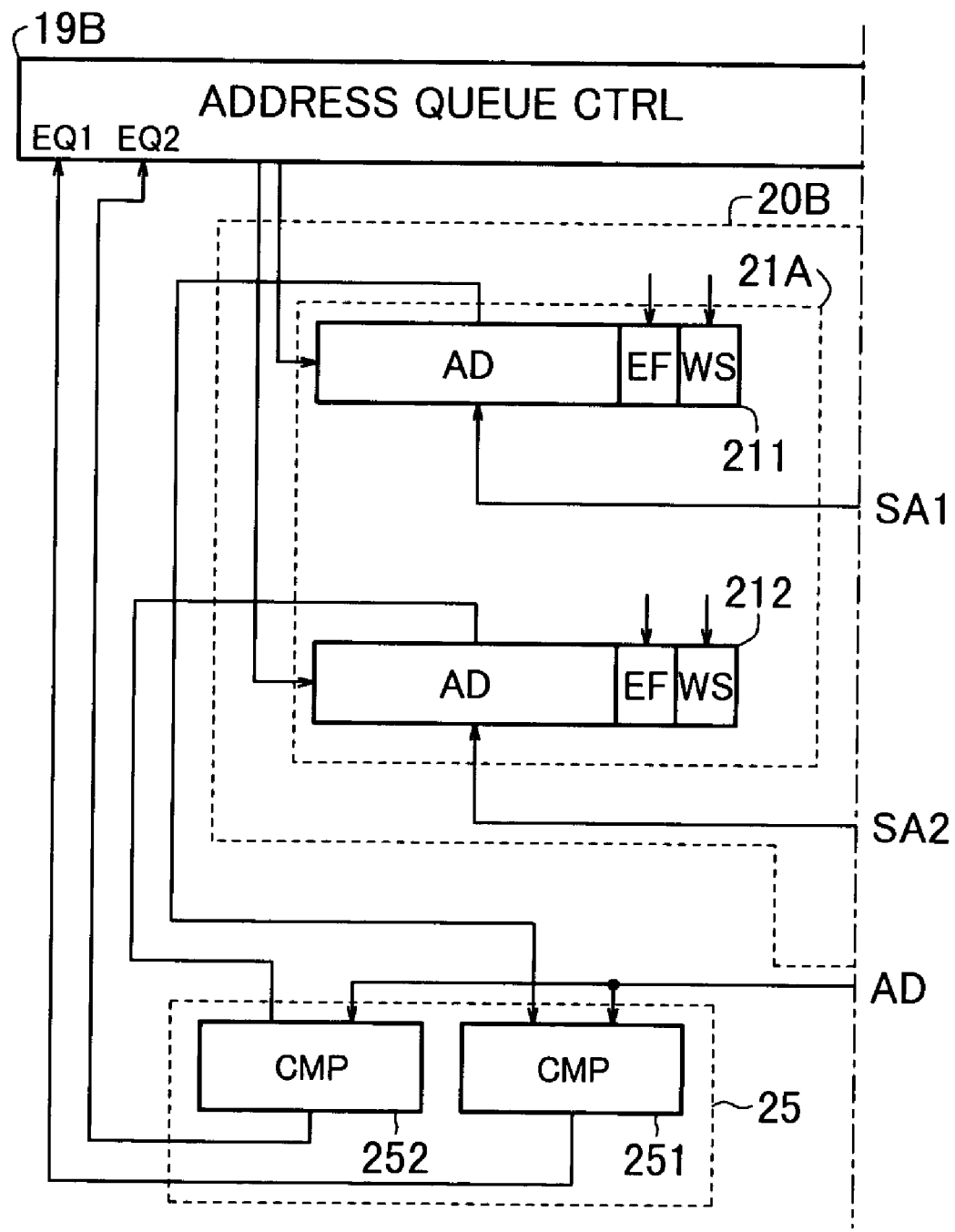
FIG. 6 is a schematic block diagram showing a part of a cache miss address queue according to a second embodiment of the present invention.
Figure 7:
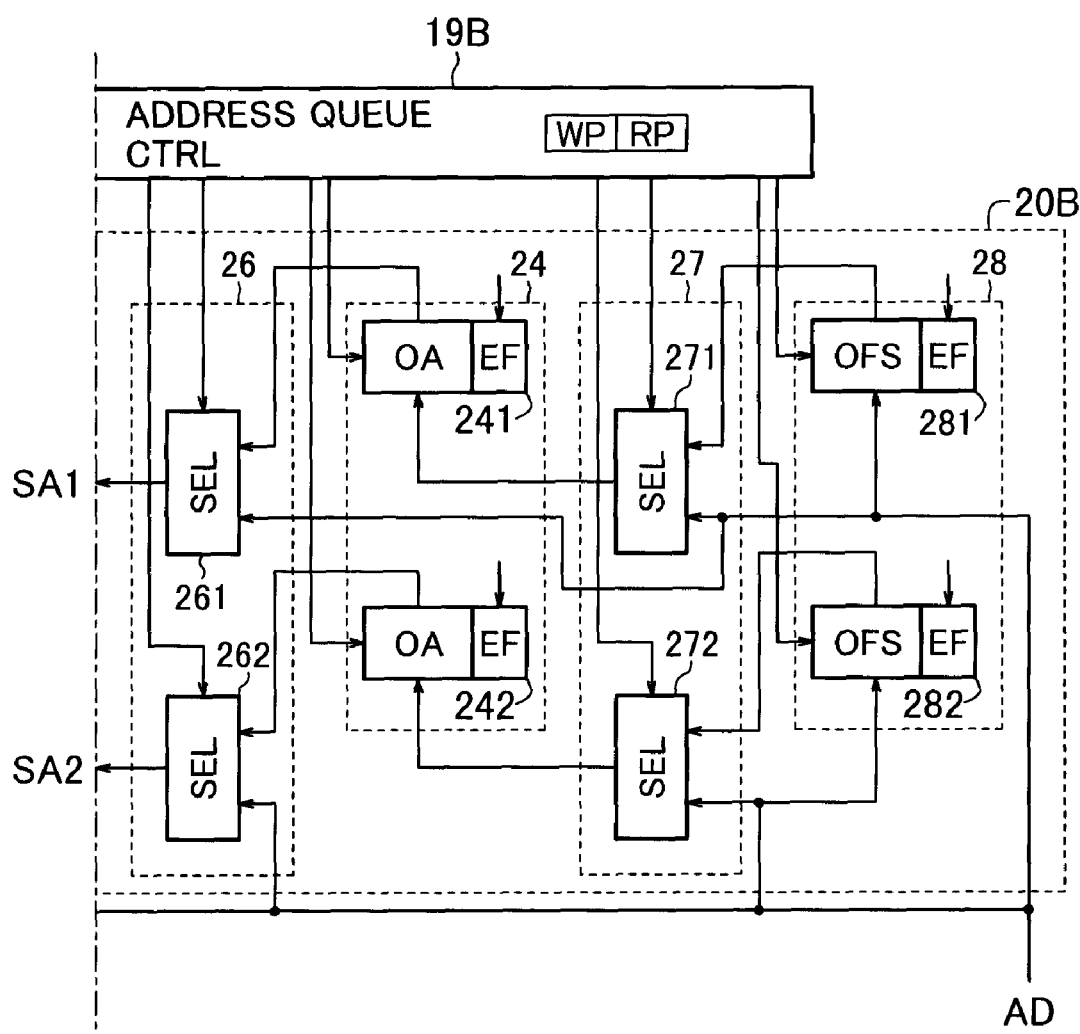
FIG. 7 is a schematic block diagram showing the remaining part of the cache miss address queue according to the second embodiment of the present invention.

FIG. 6 is a schematic block diagram showing a part of a cache miss address queue according to the second embodiment of the present invention, and FIG. 7 is a schematic block diagram showing the remaining part of the cache miss address queue.

An address queue storing & selecting circuit 20B is different from the address queue storing & selecting circuit 20A of FIG. 2, in that it further includes a selective transmission circuit 27 and a second sub-register file 28. In detail, in this circuit, a first sub-register file 24 is connected to a main register file 21A through a selective transmission circuit 26, and the second sub-register file 28 is connected to the first sub-register file 24 through the selective transmission circuit 27. The first and second sub-register files 24 and 28 have the same configuration, and the first and second selective transmission circuits 26 and 27 also have the same configuration.

The writing of the input address AD to the address queue storing & selecting circuit 20B is performed according to the following rules.

(1) When WP=i, EFmi='0', EQi='0', and AD=ADi, ADi is written to the address i of the main register file 21A, and EFmi and WSi are set.

(2a) When WP=i, EFmi='1', EQi='1', EF1si (a valid flag of the address i of the first sub-register filer 24)='0', and AD=ADi, ADi is written to the address i of the first sub-register file 24, and the valid flag EF1s is set, and the write pointer WP is incremented by 1.

(2b) When WP=i, EFmi='1', EQi='1', EF1si='1', EF2si (a valid flag of the address i of the second sub-register filer 28)='0', and AD=ADi, ADi is written to the address i of the second sub-register file 28, and the valid flag EF2si is set, and the write pointer WP is incremented by 1.

(3) When WP=i, EFmi='1', EQi='0', and AD=ADi, the write pointer WP is incremented by 1 to be WP=i+1, ADi is written to the address i+1 of the first sub-register file 24, and EF1s(i+1) is set.

The reading of the stored input address AD from the address queue storing & selecting circuit 20B is performed according to the following rules.

(1a) When RP=j, EFmj='1', AD=ADj, EF1sj='1', OFS=OFS1sj (an offset of a stored input address in the address j of the first sub-register file 24), EF2sj (a valid flag of the address j of the second sub-register file 28)='0', ADj and a wait state WSj are read from the address j of the main register file 21A, and the offset OFS1sj is transferred to the address j of the main register file 21A to be written to the offset of ADi, and then EF1sj is reset and WSj is reset.

(1b) When RP=j, EFmj='1', AD=ADj, EF1sj='1', offsets of stored input addresses in the address j of the first and second sub-register files are OFS1sj and OFS2sj, respectively, and EF2sj='1', ADj and WSj are read from the address j of the main register file 21A, and the offset OFS1sj is transferred to the address j of the main register file 21A to be written to the offset of ADi, and then the offset OFS2sj is transferred to the address j of the sub-register file 24 to replace the written offset OFS1sj with OFS2sj, and then EF2sj is reset and WSj is reset.

(2) When RP=j, EFmj='1', AD=ADj, and EF1sj='0', ADj and WSj are read from the address j of the main register file 21A, EFmj is reset, and the read pointer RP is incremented by 1.

The second embodiment also has the same advantage as the first embodiment.

Third Embodiment

Figure 8:
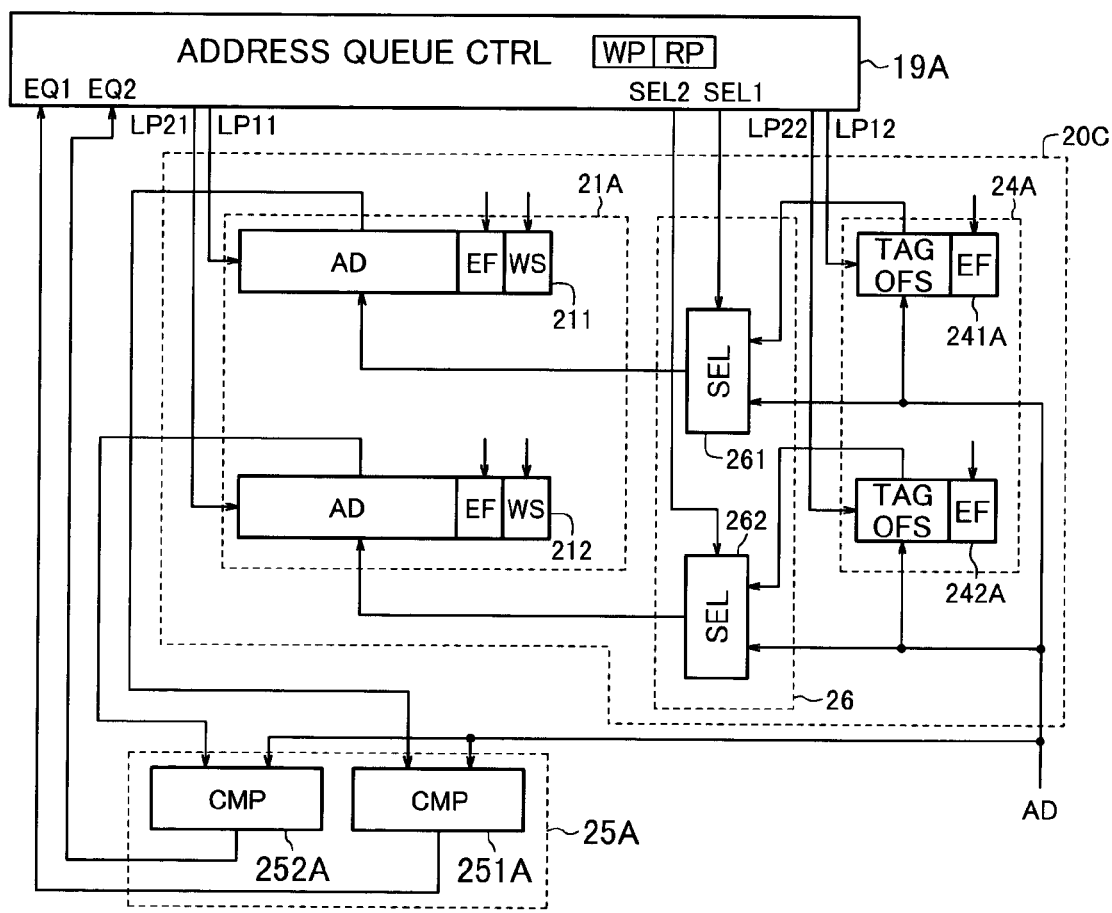
FIG. 8 is a schematic block diagram showing a cache miss address queue according to a third embodiment of the present invention.

FIG. 8 is a schematic block diagram showing a cache miss address queue according to the third embodiment of the present invention.

A sub-register file 24A in an address queue storing & selecting circuit 20C is different from the sub-register file 24 of FIG. 2 in that any one of registers 241A and 242A of the sub-register file 24A has a field of a tag TAG as well as an offset OFS. In addition, in correspondence with this difference, a comparator 251A of a tag & entry matching judgment circuit 25A causes its output matching signal EQ1 to be active, when the value of an entry ENT of an input address AD matches the value of an entry of a stored input address of a register 211, and a valid flag EF of the register 211 is '1'. The matching signal EQ1 is provided to an address queue control circuit 19A. A comparator 252A operates in the same manner as the comparator 251A.

The same rules as those of the first embodiment are applied to the writing of the input address AD to the address queue storing & selecting circuit 20C and the reading of the stored input address therefrom.

According to the third embodiment, when the value of the entry ENT of the input address AD matches the value of an entry of a stored input address previously written to the main register file 21A, the tag TAG and offset OFS of the input address AD are written to the sub-register file 24A, thereby obtaining the same advantage as the first embodiment.

Fourth Embodiment

Figure 9:
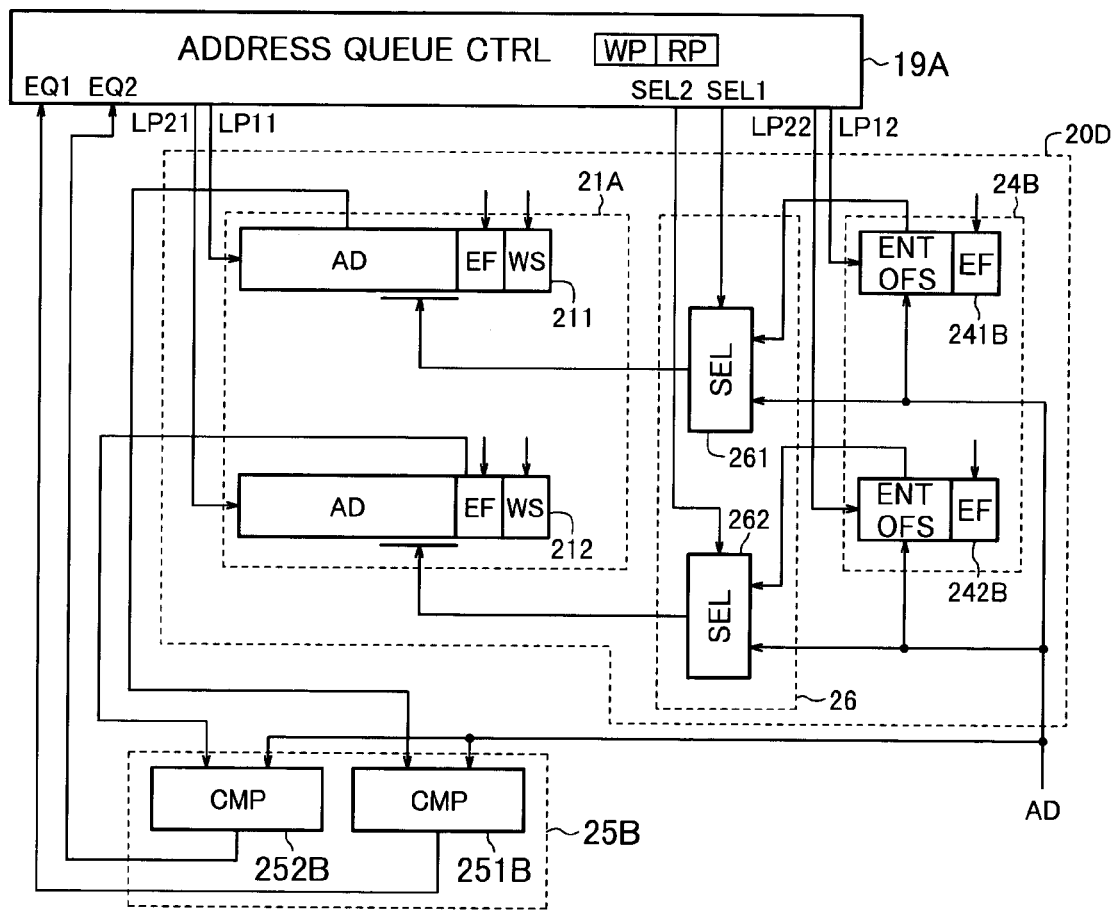
FIG. 9 is a schematic block diagram showing a cache miss address queue according to a fourth embodiment of the present invention.
Figure 10:
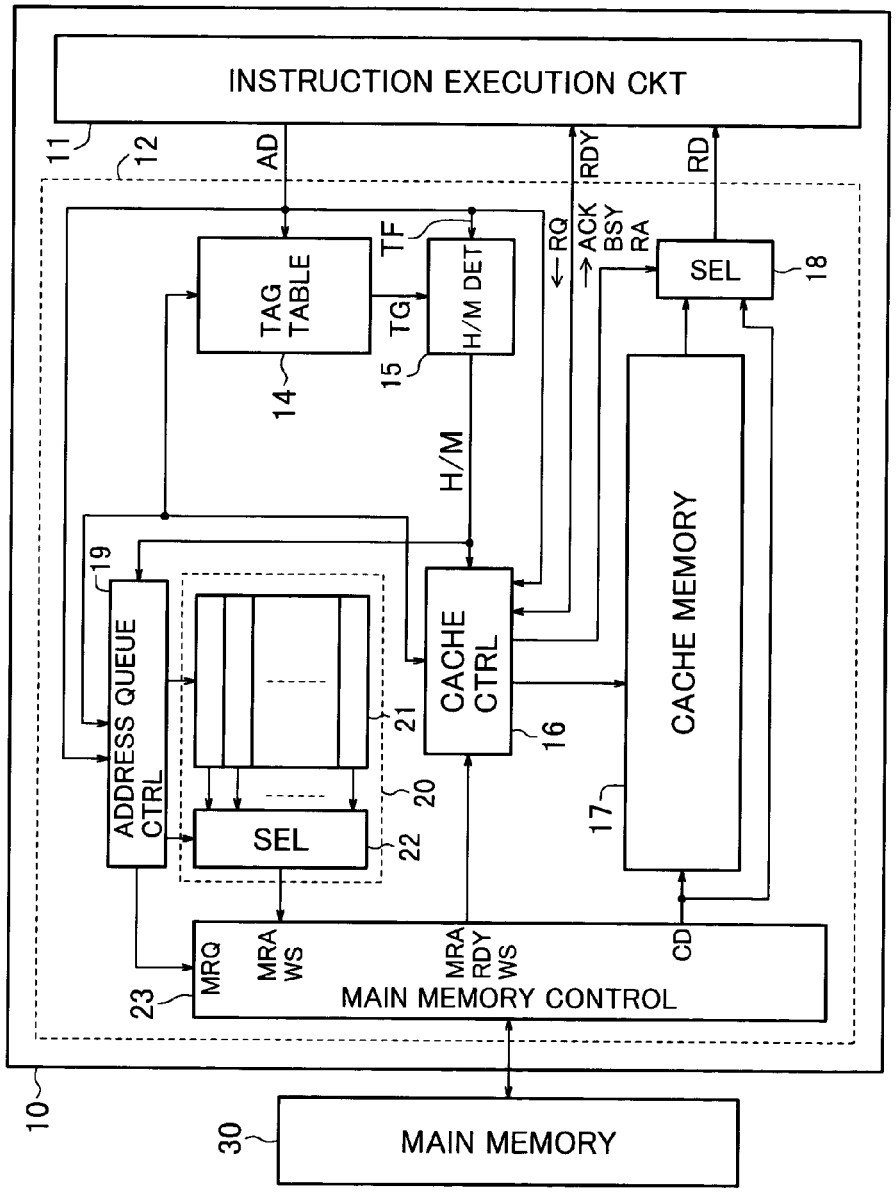
FIG. 10 is a schematic block diagram showing a processor of the prior art connected to a main memory.
Figure 11:
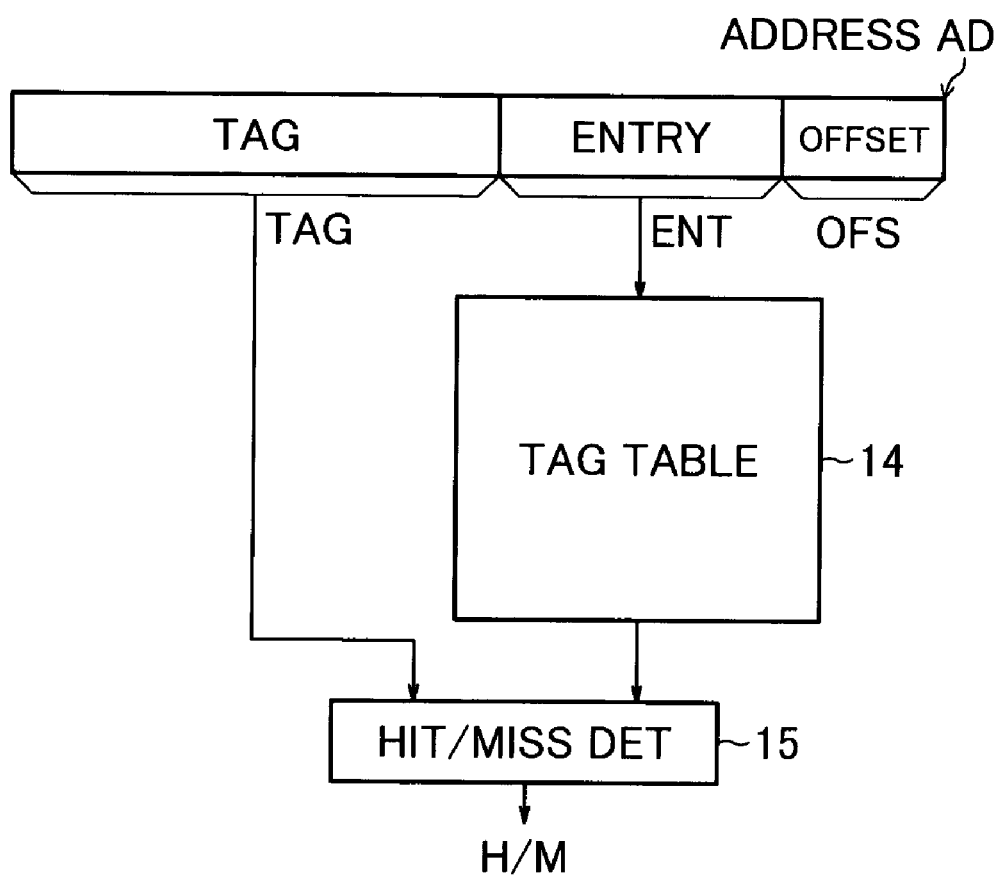
FIG. 11 is a view illustrating the relationship between a hit/miss judgment circuit, a tag table, and a field configuration of an input address AD that is defined in correlation with a cache memory.

FIG. 9 is a schematic block diagram showing a cache miss address queue according to the fourth embodiment of the present invention.

A sub-register file 24B in an address queue storing & selecting circuit 20D is different from the sub-register file 24 of FIG. 2 in that any one of registers 241B and 242B of the sub-register file 24B has a field of an entry ENT as well as an offset OFS. In addition, in correspondence with this difference, a comparator 251B of a tag & entry matching judgment circuit 25B causes its output matching signal EQ1 to be active, when the value of a tag TAG of a stored input address AD matches the value of a tag TAG of a stored input address of a register 211, and a valid flag EF of the register 211 is '1'. The matching signal EQ1 is provided to an address queue control circuit 19A. A comparator 252B operates in the same manner as the comparator 251B.

The same rules as those of the first embodiment are applied to the writing of the input address AD to the address queue storing & selecting circuit 20D and the reading of the stored input address therefrom.

According to the fourth embodiment, when the value of a tag TAG of the input address AD matches the value of a tag of a stored input address previously written to the main register file 21A, the entry ENT and offset OFS of the input address AD are written to the sub-register file 24B, thereby obtaining the same advantage as the first embodiment.

Although preferred embodiments of the present invention have been described, it is to be understood that the invention is not limited thereto and that various changes and modifications may be made without departing from the spirit and scope of the invention.

For example, the tag & entry matching judgment circuit 25 of FIG. 2 may also be configured to include a comparator and a multiplexer. In this case, the values of the tag TAG and entry ENT of the input address AD are provided to one input of the comparator. The other input of the comparator is connected to an output of the multiplexer, and the tag and entry values of the registers of the main register file 21A are provided to a plurality of inputs of the multiplexer, respectively. The same is true for those of FIGS. 6, 8, and 9.

In addition, although the descriptions of FIGS. 7 and 8 have been made, referring to the case where two columns of sub-register files, whose registers each have a bit length shorter than that of the main register file 21A, are provided for the main register file 21A, it is possible to provide three or more columns of sub-register files. The same is true for the third and fourth embodiments in the case where a plurality of columns of sub-register files, whose registers each have a bit length shorter than that of the main register file 21A, are provided for the main register file 21A.

Further, WS as wait state information may be composed of a plurality of bits so as to classify the wait state in more detail.

Furthermore, the cache miss address queue according to the present invention may be applied to an instruction cache as well as a data cache.

What is claimed is:

1. An information processing device for, when an input address causes a cache miss, storing and reading the input address including first and second fields on a FIFO basis to provide the input address to a main memory control circuit, the device comprising:

a first register file including a plurality of first registers for storing, in each first register, a first address consisting of the first and second fields, a valid flag indicating whether the first address is valid or invalid, and wait state information;

a second register file including a plurality of second registers, corresponding to the respective plurality of first registers, for storing, in each second register, a second address consisting of the second field, and a valid flag indicating whether the second address is valid or invalid;

a comparison circuit for comparing a value of the first field of the input address and a value of the first field of each of the plurality of first registers; and a control circuit for:

allowing the input address to be stored in one of the first registers whose valid flag indicates an invalid state, and changing this valid flag to indicate a valid state, or, if a comparison result by the comparison circuit between one of the first registers whose valid flag indicates a valid state and the input address indicates a matching, then allowing the second field of the input address to be stored in corresponding one of the second registers whose valid flag indicates an invalid state, and changing this valid flag to indicate a valid state; and selectively allowing contents of one of the first registers whose valid flag indicates a valid state to be read; if the valid flag of corresponding one of the second registers indicates an invalid state, then changing this valid flag to indicate an invalid state, or else, allowing a value of the second field of this one of the second registers to be shifted to the second field of the corresponding one of the first registers, and changing the valid flag of this one of the second registers to indicate an invalid state.

2. The information processing device according to claim 1, further comprising:

a selective transmission circuit for, in a write operation, allowing the input address to be transferred to selected one of the first or second registers, and, in a read operation, allowing contents of the second field of selected one of the second registers to be shifted toward corresponding one of the first registers.

3. The information processing device according to claim 2, wherein the control circuit includes a write pointer and the control circuit:

(1) if a valid flag of one of the first registers pointed to by the write pointer indicates an invalid state, then controls the selective transmission circuit to allow the input address to be stored in the one of the first registers pointed to by the write pointer, and changes this valid flag to indicate a valid state;

(2) or else, (a) if a comparison result by the comparison circuit between the one of the first registers pointed to by the write pointer and the input address indicates a matching, then controls the selective transmission circuit to allow the input address to be stored in one of the second registers pointed to by the write pointer, changes a valid flag of this one of the second registers to indicate a valid state, and allows the write pointer to be incremented, (b) or else, allows the write pointer to be incremented, controls the selective transmission circuit to allow the input address to be stored in the one of the first registers pointed to by the write pointer, and changes the valid flag of this one of the first registers to indicate a valid state.

4. The information processing device according to claim 3, wherein the control circuit includes a read pointer and the control circuit:

(3) allows contents of one of the first registers pointed to by the read pointer to be read; and (4) (c) if a valid flag of one of the second registers pointed to by the read pointer indicates an invalid state, then changes a valid flag of one of the first registers pointed to by the read pointer to indicate an invalid state, and allows the read pointer to be incremented, (d) or else, controls the selective transmission circuit to allow a value of the second field of this one of the second registers to be shifted to the corresponding one of the first registers so as to be written to the second field of this one of the first registers, and changes the valid flag of this one of the second registers to indicate an invalid state.

5. The information processing device according to claim 2, wherein the control circuit includes a read pointer and the control circuit:

(3) allows contents of one of the first registers pointed to by the read pointer to be read; and (4) (c) if a valid flag of one of the second registers pointed to by the read pointer indicates an invalid state, then changes a valid flag of one of the first registers pointed to by the read pointer to indicate an invalid state, and allows the read pointer to be incremented, (d) or else, controls the selective transmission circuit to allow a value of the second field of this one of the second registers to be shifted to the corresponding one of the first registers so as to be written to the second field of this one of the first registers, and changes the valid flag of this one of the second registers to indicate an invalid state.

6. The information processing device according to claim 1, wherein a plurality of the second register files are provided, each second register file having a plurality of registers in a column, and the plurality of the second register files are connected in cascade in regard to each register row of the plurality of the second register files, and the device further comprises:

a selective transmission circuit for, in a write operation, allowing the input address to be transferred to selected one of the registers in the first or second register files, and, in a read operation, allowing contents of the second field of selected registers of one row of the second register files to be shifted toward corresponding one of the first registers.

7. The information processing device according to claim 6, wherein the control circuit includes a write pointer and the control circuit:
(1) if a valid flag of one of the first registers pointed to by the write pointer indicates an invalid state, then controls the selective transmission circuit to allow the input address to be stored in the one of the first registers pointed to by the write pointer, and changes this valid flag to indicate a valid state;
(2) or else,
  (a) if a comparison result by the comparison circuit between the one of the first registers pointed to by the write pointer and the input address indicates a matching, then
  controls the selective transmission circuit to allow the input address to be stored in one of the second registers whose valid flag indicates an invalid state and whose neighboring one of the second registers has a valid flag indicating a valid state, changes the valid flag of this one of the second registers to indicate a valid state, and allows the write pointer to be incremented,
  (b) or else, allows the write pointer to be incremented, controls the selective transmission circuit to allow the input address to be stored in the one of the first registers pointed to by the write pointer, and changes the valid flag of this one of the first registers to indicate a valid state.

8. The information processing device according to claim 7, wherein the control circuit includes a read pointer and the control circuit:
(3) allows contents of one of the first registers pointed to by the read pointer to be read; and
(4) (c) if all valid flags of second registers of the second register files in a row pointed to by the read pointer indicate an invalid state, then changes a valid flag of this one of the first registers pointed to by the read pointer to indicate an invalid state, and allows the read pointer to be incremented,
(d) or else, controls the selective transmission circuit to allow contents of the second fields of the second registers in the row to be shifted toward the first register file, and changes a valid flag having a valid state at an upstream end side, with respect to the shift direction, to indicate an invalid state.

9. The information processing device according to claim 6, wherein the control circuit includes a read pointer and the control circuit:
(3) allows contents of one of the first registers pointed to by the read pointer to be read; and
(4) (c) if all valid flags of second registers of the second register files in a row pointed to by the read pointer indicate an invalid state, then changes a valid flag of this one of the first registers pointed to by the read pointer to indicate an invalid state, and allows the read pointer to be incremented,
(d) or else, controls the selective transmission circuit to allow contents of the second fields of the second registers in the row to be shifted toward the first register file, and changes a valid flag having a valid state at an upstream end side, with respect to the shift direction, to indicate an invalid state.

10. The information processing device according to claim 1, wherein the first and second fields are defined in relation to a cache memory, the first field consists of a tag field and an entry field, and the second field is an offset field which is lower order than the entry field.

11. The information processing device according to claim 1, wherein the first and second fields are defined in relation to a cache memory, the first field is an entry field, and the second field consists of a tag field of higher order than the entry field and an offset field of lower order than the entry field.

12. The information processing device according to claim 1, wherein the first and second fields are defined in relation to a cache memory, the first field is a tag field, and the second field consists of an entry field of lower order than the tag field and an offset field of lower order than the entry field.

* * * * *